(12) United States Patent
Wolgamot et al.

(10) Patent No.: US 10,760,842 B2
(45) Date of Patent: Sep. 1, 2020

(54) METHOD AND SYSTEM FOR IMPROVING REFRIGERATION SYSTEM EFFICIENCY

(71) Applicant: DC Engineering, P.C., Meridian, ID (US)

(72) Inventors: Thomas Dean Wolgamot, Missoula, MT (US); Timothy Alan Gwyn, Missoula, MT (US); William Michael Crist, Missoula, MT (US)

(73) Assignee: DC Engineering, Inc., Meridian, ID (US)

(*) Notice: Subject to any disclaimer, the term of this patent is extended or adjusted under 35 U.S.C. 154(b) by 152 days.

(21) Appl. No.: 15/825,287

(22) Filed: Nov. 29, 2017

(65) Prior Publication Data

US 2018/0149397 A1 May 31, 2018

Related U.S. Application Data

(60) Provisional application No. 62/427,907, filed on Nov. 30, 2016.

(51) Int. Cl.
*F25B 1/10* (2006.01)
*F25B 49/02* (2006.01)
(Continued)

(52) U.S. Cl.
CPC .............. *F25B 49/027* (2013.01); *F25B 5/02* (2013.01); *F25B 41/04* (2013.01); *F25B 41/062* (2013.01); *F25B 49/02* (2013.01); *F25B 2313/031* (2013.01); *F25B 2341/065* (2013.01); *F25B 2341/066* (2013.01); *F25B 2400/0751* (2013.01); *F25B 2600/0251* (2013.01);
(Continued)

(58) Field of Classification Search
CPC ...... F25B 49/027; F25B 41/062; F25B 41/04; F25B 2341/065; F25B 2600/2513; F25B 5/02; F25B 2341/066; F25B 2400/0751; F25B 2600/0251; F25B 2700/21162; F25B 2700/21163; F25B 2700/21175; F25B 2600/0253; F25B 2600/111
See application file for complete search history.

(56) References Cited

U.S. PATENT DOCUMENTS 4,193,270 A    3/1980  Scott
5,426,952 A *  6/1995  Bessler .................. F25B 41/062
                                               62/211

(Continued)

FOREIGN PATENT DOCUMENTS

EP         1 914 482        4/2008

*Primary Examiner* — Henry T Crenshaw
*Assistant Examiner* — Kamran Tavakoldavani
(74) *Attorney, Agent, or Firm* — Hawley Troxell Ennis & Hawley LLP; Rivkah Young

(57) ABSTRACT

A method and system for improving energy efficiency of a refrigeration system include system components such as a condenser, one or more expansion valves, an evaporator, one or more compressors, and a system controller electrically coupled to the one or more of the system components, according to one embodiment. The system controller is configured to selectively actuate, directly or indirectly, the one or more expansion valves, the condenser, and/or the one or more compressors, at least partially based on temperatures and/or pressures of the system fluid at various points of the system, to control a temperature of a refrigerated area.

5 Claims, 4 Drawing Sheets

(51) Int. Cl.
*F25B 5/02* (2006.01)
*F25B 41/04* (2006.01)
*F25B 41/06* (2006.01)

(52) U.S. Cl.
CPC .......... *F25B 2600/2513* (2013.01); *F25B 2700/2106* (2013.01); *F25B 2700/21162* (2013.01); *F25B 2700/21163* (2013.01); *F25B 2700/21175* (2013.01); *Y02B 30/72* (2013.01)

(56) References Cited

U.S. PATENT DOCUMENTS

| | | |
|---|---|---|
| 6,185,949 B1 | 2/2001 | Madigan |
| 2005/0217292 A1 | 10/2005 | Onishi et al. |
| 2011/0079042 A1* | 4/2011 | Yamashita ............ C09K 5/045 |
| | | 62/498 |
| 2011/0209485 A1 | 9/2011 | Lifson et al. |
| 2016/0091236 A1* | 3/2016 | Hammond ............ F25B 49/02 |
| | | 62/117 |

\* cited by examiner

METHOD AND SYSTEM FOR IMPROVING REFRIGERATION SYSTEM EFFICIENCY

BACKGROUND

Refrigeration systems are fundamental to the modern way of life. Refrigeration systems perform various life-extending and life-saving functions, such as maintaining safe temperatures of food and beverages and extending the shelf-life of blood donations, organ donations, and various other live cultures and medicines.

In commercial grocery or commercial food applications, refrigeration systems can use expansion valves and a compressor to establish and maintain particular temperatures in refrigeration spaces. When installed, traditional refrigeration systems are set up so that they operate well-enough in warm temperatures and well-enough in cool temperatures. The systems are not well equipped to efficiently run at wide ranges or widely swinging temperatures because system component operations largely limit the range of temperatures and pressures the refrigeration system fluid can operate at. The compressor is operated to achieve a pre-determined pressure increase from the compressor suction to the compressor discharge, and the expansion valves are operated to achieve a pre-determined pressure drop from the expansion valve inlet to the expansion valve outlet. However, the pre-determined settings for the compressor and the expansion valves ignore and fail to accommodate potential system effects that occur due to changes in the surrounding environment, e.g., changes in ambient temperatures or other external effects. Therefore, traditional commercial refrigeration systems, even in their abundant quantities, can be inefficient and regularly consume more power than is needed to cool refrigeration spaces. In some instances, the excess power consumption is considerable.

What is needed is a method and system for improving refrigeration system efficiency.

SUMMARY

Embodiments of the disclosed refrigeration system provide improvements over traditional commercial refrigeration systems by electronically controlling and/or adjusting expansion valves (e.g., thermal expansion valves), compressor motors, and/or condenser or other system fans to improve the power efficiency, e.g. reduce the overall power consumption, of the refrigeration system, to optimize or otherwise minimize the power consumption resulting from the operation of the refrigeration system, and to protect system components, e.g., one or more compressor motors.

The refrigeration system automatically monitors system fluid (e.g., R-134A refrigerant) temperatures and pressures, operates expansion valves (i.e., opens, shuts, or modulates, etc.), turn on or off or modulate condenser fans, and turns on or off or modulate compressors to optimize system conditions to fully utilize the evaporator circuits. The system operates the compressors to maintain desired cooling conditions while also minimizing power consumption. Thus, the system is able to achieve a predetermined range of pressure differentials across the expansion valves and to achieve a predetermined range of output pressures from the expansion valves.

Traditional refrigeration systems have a fixed minimum discharge head pressure for compressor motors, but the operational ability of the disclosed refrigeration system to monitor and adjust differential and output pressures from the expansion valves enables the refrigeration system to vary the discharge head pressure and to selectively increase and decrease the work (e.g., compression) performed by a compressor configuration (e.g., a configuration of a number of compressor motors). When ambient conditions change (e.g., when outside environmental temperatures increase or decrease), the refrigeration system is configured to take one or more actions including increasing or decreasing the number compressors in operation or the length of time one or more compressors are in operation, increasing or decreasing the revolutions per minute (RPMs) of one or more compressors, increasing or decreasing the compressor ratio of one or more compressors, and/or otherwise optimizing of the amount of power consumed by a compressor configuration. This enables the refrigeration system to maintain a desired condition in refrigerated areas, while consuming less power than traditional systems.

In contrast to traditional refrigeration systems that work on fixed minimum compressor discharge head pressure and an inability to fully control expansion valve operations, the disclosed refrigeration system adjusts operating characteristics of the system components, at least partially based on ambient conditions (e.g., environmental temperature and pressure in the area where condensers and compressors are typically installed) to reduce operational costs when ambient conditions allow for reduced power consumption, according to one embodiment. In geographic locations where the ambient temperatures vary greatly from day to night or from season to season (e.g., summer to winter), the disclosed refrigeration system adaptively adjusts operating characteristics (e.g., expansion valve and/or compressor settings, among others) to minimize system power consumption to efficiently and economically provide and/or maintain a particular air conditioning of a refrigerated area, such as a refrigerated storage area at a store providing cold drinks, meat, and the like according to one embodiment.

By providing monitoring and adjusting system components within the refrigeration system, implementations of embodiments of the present disclosure allow for significant improvement to the technical fields of refrigeration, refrigeration system, food services, according to one embodiment. As one illustrative example, by monitoring system fluid (e.g., refrigerant) characteristics, adjusting expansion valves, and adjusting compressor operations, refrigeration areas can be cooled to deliver refrigerated items with less energy costs, using fewer natural resources, and with system components that may experience increased longevity due to decreased operational hours and wear.

Figure 1:
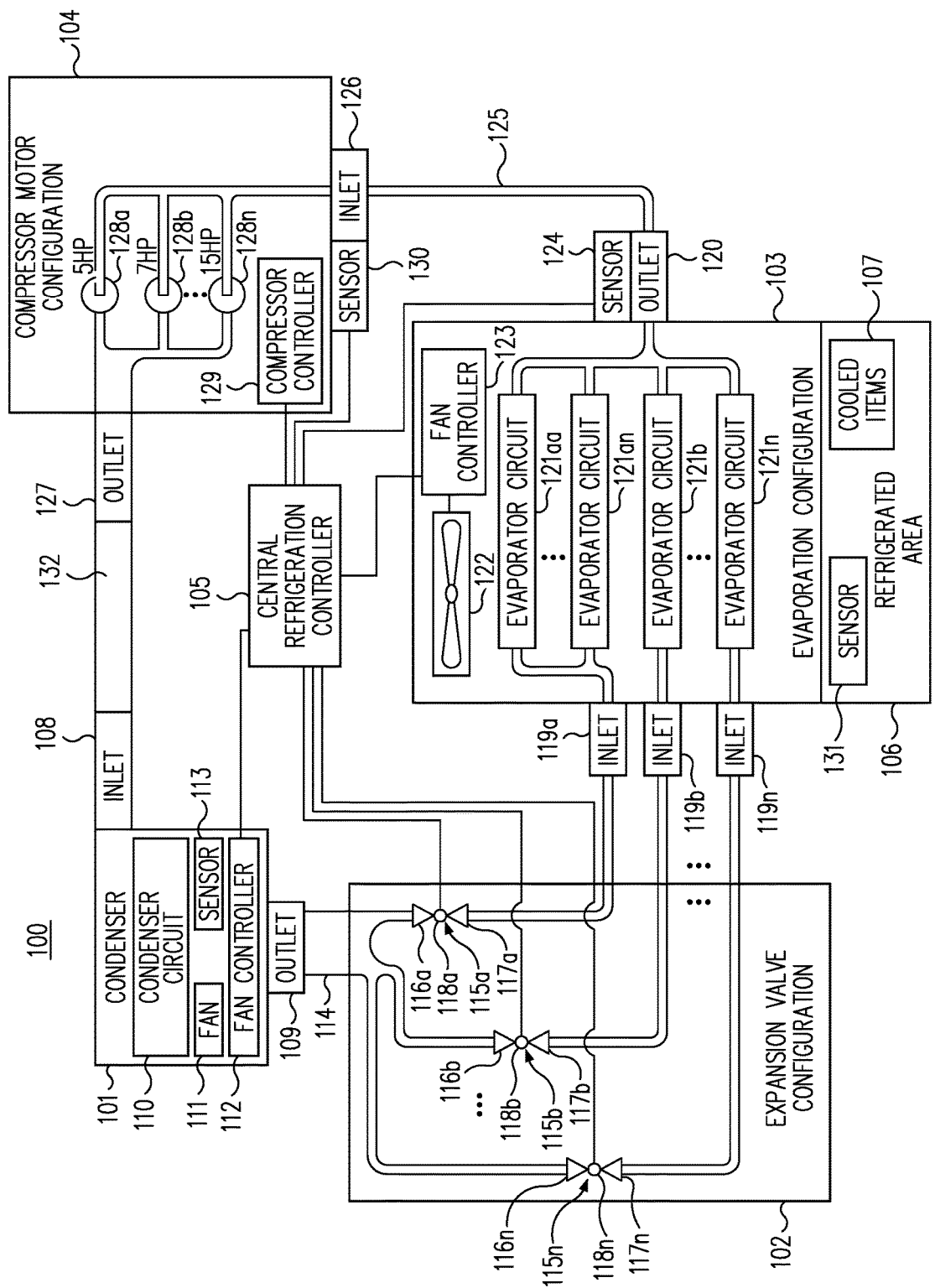
FIG. 1 is a block diagram of a refrigeration system, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

The HARDWARE ARCHITECTURE and PROCESS sections herein describe systems and processes suitable for improving the efficiency of traditional refrigeration systems, according to various embodiments.

Hardware Architecture

Embodiments of the disclosed refrigeration system provide improvements over traditional refrigeration systems by electronically controlling and/or adjusting expansion valves (e.g., thermal expansion valves), compressors, and/or system fans to maximize the efficiency of the refrigeration system, to reduce the power consumption of the refrigeration system, and to protect system components (e.g., one or more compressors). The refrigeration system monitors system fluid (e.g., R-134A refrigerant) temperatures and pressures and operates (e.g. opens, shuts, modulates, etc.) expansion valves, to achieve a predetermined range of pressure differentials across the expansion valves and to achieve a predetermined range of output pressures from the expansion valves.

Traditional refrigeration systems have a fixed minimum discharge head pressure for compressors, but the capability of the disclosed refrigeration system to monitor and adjust differential and output pressures from the expansion valves enables the refrigeration system to vary the discharge head pressure and to selectively increase and decrease the work (e.g., compression) performed by a compressor configuration (e.g., a configuration of a number of compressor motors). When ambient conditions permit (e.g., when ambient temperatures decrease), the refrigeration system reduces the number of compressors in operation, and/or reduces the revolutions per minute (RPMs) of one or more compressor motors, and/or reduces the compressor ratio across one or more compressors, and/or otherwise reduces power consumption of the refrigeration system. This enables the refrigeration system to maintain refrigerated/cooled air to refrigerated areas, while drawing less power, resulting in a more efficient system.

In contrast to traditional refrigeration systems that work on fixed minimum compressor discharge head pressure and an inability to fully control expansion valve operations, the disclosed refrigeration system adjusts operating characteristics of the system components, at least partially based on ambient conditions (e.g., temperature and pressure) and refrigerated space conditions, to reduce operational costs when ambient conditions allow for reduced compressor motor power consumption, according to one embodiment. In geographic locations where temperatures vary greatly from day to night or from season to season (e.g., summer to winter), the refrigeration system adaptively adjusts operating characteristics (e.g., expansion valve settings, condenser fan speeds, and/or compressor motor settings) to optimize system power consumption in reduced ambient temperatures and to maintain or otherwise optimize system power consumption in warm to hot ambient temperatures, to provide and/or maintain a particular predetermined condition of a refrigerated area, according to one embodiment.

In this disclosure, reference is made to vapors and liquids. One or ordinary skill will readily appreciate that a vapor and a liquid are the same except for the density of the substance, e.g. fluid, being referred to. As one example, water is generally thought of as a liquid, but the surface of water typically has an interface to air, above which water vapor exists, and that water vapor still comprises $H_2O$ but at a much lower density than in the liquid form commonly referred to in everyday life. Further, reference may be made to first and second vapors, which may refer to the same substance in each case, but located in different portions of the same system. Finally, first and second vapors may also be referring to the same substance at different pressures and temperatures, and thus possible in gas form, liquid form, or saturated form.

FIG. 1 illustrates a block diagram of a refrigeration system 100 that is configured to electronically control the operation of one or more compressor motors, one or more condenser fans and/or one or more expansion valves, based on one or more characteristics of the system fluid, e.g., a refrigerant such as R-134A, according to one embodiment. The refrigeration system 100 monitors characteristics of the system fluid, such as pressure and temperature, at different locations within the refrigeration system 100 to determine and/or to adjust the operation of one or more expansion valves, one or more condenser motors, and/or one or more compressor motors, according to one embodiment. By selectively operating, manipulating and/or actuating one or more expansion valves, one or more condenser motors, and/or one or more compressors within the refrigeration system 100, the refrigeration system 100 air conditions, cools, and/or refrigerates an area, e.g. a refrigeration space, and items in the area while drawing/consuming less energy/power than traditional refrigeration system configurations, according to one embodiment. Due to the abundance of traditional refrigeration systems presently in use, improvement to the efficiency of those refrigeration systems through use of the techniques described herein can significantly reduce cumulative power currently being consumed by those traditional cooling systems, according to one embodiment.

The refrigeration system 100 includes a condenser 101, an expansion valve configuration 102, an evaporator configuration 103, a compressor motor configuration 104, and a central refrigeration controller 105, configured to regulate the environment of cooled items 107 to control the temperature of cooled items 107, according to one embodiment. The refrigeration system 100 manipulates the operation of one or more expansion valves, one or more condenser fan motors, and/or one or more compressors, based on system fluid characteristics, to provide an efficiently operating refrigeration system that consumes less power than traditional refrigeration systems, according to one embodiment.

The condenser 101 receives the system fluid as a high pressure vapor at an inlet 108 and discharges a high pressure liquid from an outlet 109 to enable the refrigeration system 100 to provide that high pressure liquid to one or more evaporator circuits 121aa through 121n to cool/air-condition refrigerated area 106 and cooled items 107, according to one embodiment. The high pressure vapor and the high pressure liquid can have pressures in the range of 400-800 psi, or up to 1600 psi, depending upon the type of system fluid used in the refrigeration system 100.

The system fluid is selected from one of a number of refrigerants, including, but not limited to, R-290, R-401A, R-401B, R-409A, R-134A, R-22, R-407C, R-410A, R-408A, R-404A, R-507, R-448A, R-449A, R-450, R-744, and any combination thereof, according to one embodiment.

In one embodiment, the system fluid has a relatively low boiling point (e.g., less than −14 degrees Fahrenheit) at 14.7 psia (standard atmospheric pressure), to enable the system fluid to evaporate at temperatures that are adequate to cool, refrigerate, or air-condition the refrigerated area 106. The condenser 101 receives the system fluid at a high pressure so that the system fluid can be cooled from a vapor phase to a liquid phase at a wide range of ambient temperatures, e.g., 0-130° F.

The condenser 101 includes a condenser circuit 110, a fan 111, a fan controller 112, and a sensor 113, according to one embodiment. The condenser circuit 110 includes, in one embodiment, one or more sections of pipe coupled between the inlet 108 and the outlet 109 to enable the phase of the high pressure vapor to be changed to a high pressure liquid phase. Other coupling methods and structures are also available, and will be readily understood by one of ordinary skill having the benefit of this disclosure. The condenser circuit 110 includes one or more pipes configured, e.g., in a serpentine or other configuration, to cool the system fluid by using the fan 111 to pass air across the condenser circuit 110. In one embodiment, water may be passed together with air, or instead of air, across the condenser circuit 110. Condenser circuit 110 includes a plurality of aluminum fins thermally coupled to the piping or other coupling mechanism to ensure heat transfer between the system fluid and the ambient air, according to one embodiment. Passing air across the condenser circuit 110 reduces the temperature of the system fluid and causes the system fluid to change from a vapor phase to a liquid phase, according to one embodiment. Condenser 101 uses fan controller 112 to operate fan 111 and to control the speed of fan 111, e.g., low, medium, and high speeds, or specific variable RPM's, according to one embodiment. Condenser 101 is configured to operate fan controller 112, at least partially based on a temperature, a pressure, and/or other characteristic of the system fluid as determined by sensor 113, according to one embodiment. Sensor 113 can be a temperature sensor, a pressure sensor, or combination of one or more sensors to determine characteristics of the system fluid, according one embodiment.

Fan controller 112 receives control signals (e.g., is operated by) the central refrigeration controller 105, at least partially based on system fluid characteristics determined by sensor 113 and/or determined by central refrigeration controller 105, according to one embodiment. For example, central refrigeration controller 105 is configured to decrease or increase the speed of fan 111 using fan controller 112 based on information received from sensor 113 and/or from other sensors within the refrigeration system 100, according to one embodiment. When the ambient (e.g., outside) temperatures are higher (e.g., 90° F.), the high pressure vapor received by the condenser 101 will need relatively more energy (e.g., higher pressure and/or higher temperature) to change phase from vapor to liquid when "cooled" by the fan 111 with higher temperatures (e.g., 90° F.).

Correspondingly, when ambient temperatures are lower (e.g., 30° F.), the high pressure vapor received by the condenser 101 can have less energy (e.g., lower pressure and/or lower temperature), requiring less energy to change the system fluid phase from vapor to liquid when cooled by the fan 111. Thus, the refrigeration system 100 is configured to adjust the operations of condenser fan 111 and/or one or more compressors in the compressor motor configuration 104, at least partially based on characteristics of the system fluid, as detected at sensor 113, for example, and reduces the work exerted by the compressors in relatively lower ambient temperatures, according to one embodiment.

The expansion valve configuration 102 is coupled to the condenser 101 with one or more sections of pipe 114 to receive the system fluid from the condenser 101, according to one embodiment. The expansion valve configuration 102 includes one or more expansion valves configured to receive the system fluid in a high-pressure liquid phase (e.g., 50-600, 600-800, up to 1800 psi) and to discharge the system fluid in one or more of a variety of fluid phases, e.g., vapor, saturated vapor, and/or low pressure liquid, according to one embodiment. The expansion valve configuration 102 can include one, two or three expansion valves, less than 10 expansion valves, tens of expansion valves, hundreds of expansion valves, or any quantity of expansion valves to reduce the pressure and/or to change the phase of the system fluid, according to one embodiment.

The expansion valve configuration 102 includes an expansion valve 115a, an expansion valve 115b, and an expansion valve 115n (which is representative of an nth number of expansion valves included in the expansion valve configuration 102), according to one embodiment. The expansion valves 115a, 115b, and 115n are hereafter collectively referenced as expansion valves 115.

The expansion valves 115 include valve inlets 116 (individually referenced as 116a, 116b, and 116n), valve outlets 117 (individually referenced as 117a, 117b, and 117n) and valve actuators 118 (individually referenced as 118a, 118b, and 118n), according to one embodiment. The valve inlets 116 of the expansion valves 115 are coupled to the condenser 101 through one or more sections of pipe 114 to receive the system fluid, e.g., in a liquid phase.

In various embodiments, one or more of valve inlets 116a, 116b, and 116n are coupled to condenser 101 through one or more pressure and/or temperature sensors configured to provide central refrigeration controller 105 with temperature and/or pressure data relating to the system fluid condition at the respective valve inlets 116a, 116b, and 116c. In one embodiment, two or more of valve inlets, such as valve inlets 116a and 116b share a single coupling from condenser 101 and also a single pressure and/or temperature sensor.

The valve outlets 117 discharge the system fluid at a pressure that is equal to or lower than the pressure of the system fluid at the valve inlets 116. By reducing the pressure of the system fluid from the valve inlets 116 to the valve outlets 117, one or more of the expansion valves 115 convert the system fluid from a liquid phase to one of a vapor phase, a saturated vapor phase, or a reduced pressure liquid phase, in accordance with the pressure-temperature characteristics of the system fluid, according to one embodiment. According to one embodiment, the expansion valve configuration 102 reduces the system fluid from a first pressure (e.g., 50-600 psi) to a second pressure (e.g., less than 5 psi or less than 2 psi, 5 psi to 50 psi, 50 psi to 100 psi) to enable the system fluid to be easily evaporated in the evaporator configuration 103 to refrigerate the refrigerated area 106.

The valve actuators 118 of one or more of the expansion valves 115 are monitored and operated/actuated by the central refrigeration controller 105 to adjust the pressure differential across the expansion valves 115 so that the system fluid cools/conditions the refrigerated area 106 and so that the system fluid delivers the desired predetermined pressure-temperature characteristics at the outlet of the evaporator configuration 103, according to one embodiment.

The expansion valves 115 are electrically and/or mechanically coupled (e.g., through one or more communication channels or wires) to the central refrigeration controller 105 to enable the central refrigeration controller 105 to remotely monitor and/or operate the expansion valves 115. The central refrigeration controller 105 remotely monitors and/or operates the expansion valves 115 based on head pressure from the condenser and/or based on the temperature/characteristics of the vapor discharged from the evaporator configuration 103, according to one embodiment. In one embodiment, the central refrigeration controller 105 monitors valve position, stores a digital representation of the valve positions, and transmits valve position adjustments to the valve actuators 118 based on the stored digital representations of the valve positions to control the pressure differential across the expansion valves 115.

The expansion valves 115 have built-in minimum pressure drop characteristics that the central refrigeration controller 105 monitors and compensates for by closing, opening, and/or throttling one or more of the expansion valves 115, according to one embodiment. For example, if the pressure drop across the expansion valves 115 nears an operational minimum, the central refrigeration controller 105 can be configured to shut off one or more of the expansion valves 115 to increase the volume through fewer valves and to increase the pressure differential across all of the valves. The expansion valves 115 decrease the pressure of the system fluid in order to decrease the boiling point of the system fluid, based on the pressure-temperature characteristics for the system fluid, and enable the system fluid to boil, evaporate, and be superheated through the evaporator configuration 103, in order to absorb heat. The output pressure for the expansion valves 115 partially determines the discharge head pressure for the compressor configuration motor 104 and therefor at least partially determines how aggressively the compressor motor configuration 104 will work to compress the system fluid for the condenser 101. Furthermore, the lower the output pressure achieved by the expansion valves 115, the easier it becomes for the evaporator configuration to superheat the system fluid because lower pressure results in a lower boiling point for the system fluid. However, if the expansion valves 115 are operated at a pressure differential that is below a minimum pressure differential for the valves, then the expansion valves may insufficiently decrease the pressure of the system fluid so that the evaporator configuration is unable to superheat the system fluid. Such a condition is particularly problematic for system components like the compressors because any liquid in the system fluid can damage the compressors and render them inoperable.

In various embodiments, one or more of valve outlets 117a, 117b, and 117n are coupled to evaporator configuration 103 through one or more pressure and/or temperature sensors configured to provide central refrigeration controller 105 with temperature and/or pressure data relating to the system fluid condition at the respective valve outlets 117a, 117b, and 117n. In one embodiment, two or more of valve outlets, such as valve outlets 117a and 117b share a single coupling to evaporator configuration 103 and also a single pressure and/or temperature sensor.

The evaporator configuration 103 receives the system fluid at one or more of inlets 119a, 119b, 119n (collectively inlets 119, which represent an nth number of inlets) and discharges the system fluid in a vapor phase from an outlet 120, to refrigerate/cool/condition the refrigerated area 106 and the cooled items 107, according to one embodiment. Using one or more evaporator circuits, the evaporator configuration transfers heat between the system fluid and the air of the refrigerated area 106 so that the refrigerated area 106 loses heat and so that the system fluid receives heat, according to one embodiment. By removing heat from the refrigerated area 106 the cooled items 107 experience a reduction in temperature, and the system fluid flowing between the inlets 119 and the outlet 120 receives heat/energy so that the phase of the system fluid becomes a vapor or a superheated vapor, according to one embodiment.

The evaporator configuration 103 include one or more evaporator circuits having one or more of a variety of physical configurations, shapes, lengths, and/or pipe diameters, according to one embodiment. The evaporator configuration 103 includes an evaporator circuit 121aa and an evaporator circuit 121an (evaporator circuits 121aa-121an representing a number of evaporator circuits) coupled between the inlet 119a and the outlet 120; an evaporator circuit 121b coupled between the inlet 119b and the outlet 120; and an evaporator circuit 121n (representing an nth evaporator circuit) coupled between the inlet 119n and the outlet 120, according to one embodiment. The evaporator circuits 121aa, 121an, 121b, and 121n are collectively referred to as evaporator circuits 121. The evaporator circuits 121 are illustrated to show that one or more evaporator circuits 121 can be coupled between the inlet 119a and the outlet 120, to show that a single one of the evaporator circuits 121 may be coupled between the one or more inlets 119 and the outlet 120, and to show that multiple evaporator circuits 121 can be coupled between one or more of the inlets 119 and the outlet 120, according to various evaporator circuit embodiments. Each of the evaporator circuits 121 include one or more sections of pipe having one or more inner diameters, outer diameters, and made from one or more various materials, e.g., copper, aluminum, brass, steel, and the like, to exchange heat between the system fluid flowing through the evaporator circuits 121 and the air of the refrigerated area 106, according to one embodiment.

In various embodiments, various individual evaporator circuits such as evaporator circuits 121aa, 121an, 121b, etc. have individual pressure and/or temperature sensors coupled to their outputs prior to those outputs being combined at outlet 120. In one embodiment, the individual pressure and/or temperature sensors are configured to provide pressure and/or temperature data to central refrigeration controller 105.

The refrigeration system 100 is configured to manipulate the temperature, phase, and pressure of the system fluid by selectively controlling system fluid through or modulating one or more of the evaporator circuits 121 (e.g., by closing and/or opening one or more of the expansion valves 115 that are upstream from the evaporator circuits 121), according to one embodiment.

The evaporator configuration 103 includes a fan 122, a fan controller 123, and a sensor 124 to manipulate/adjust characteristics of the system fluid at the outlet 120, according to one embodiment. For example, the fan controller 123 can be configured to receive one or more fan control signals from the central refrigeration controller 105 to set, change, throttle, or operate the fan 122 to move air across the evaporator circuits 121 so that the system fluid at the outlet 120 maintains a predetermined or desired temperature or range of temperatures, according to one embodiment. For example, the fan controller 123 receives signals from the central refrigeration controller 105 to cause the system fluid to be superheated to 6-8° F. above the boiling temperature for the system fluid, e.g., above 22.2° F. at 20 psig sea level for R-134A refrigerant, according to one embodiment. In one embodiment, the fan controller 123 receives signals from the central refrigeration controller 105 to operate the fan 122 to one or more speeds to cause the system fluid to be superheated to 6-8° F., according one embodiment. In one embodiment, central refrigeration controller 105 communicates with individual distributed subsystem controllers, in order to manage the overall refrigeration system.

The fan controller 123 is controlled by the central refrigeration controller 105 based on a temperature, a pressure, or other characteristic of the system fluid that is measured or determined by the sensor 124, according to one embodiment. As discussed below, the central refrigeration controller 105 may also be configured to throttle, operate, actuate, shut off, modulate and/or turn on one or more of the expansion valves 115 based at least in part on the system fluid characteristics measured/determined by the sensor 124, according to one embodiment. The central refrigeration controller 105 is also configured to operate the fan 122, one or more of the expansion valves 115, and/or the compressor motor configuration 104 at least partially based on the sensor 131 that monitors the temperature of the refrigerated area 106, according to one embodiment.

The compressor motor configuration 104 is coupled to the evaporator configuration 103 through one or more sections of pipe 125 to enable the compressor motor configuration 104 to receive the system fluid (e.g., the superheated vapor) at an inlet 126, so that the compressor motor configuration 104 can increase the pressure of the system fluid and discharge the system fluid at an outlet 127 through one or more sections of pipe 132 to the condenser 101, according to one embodiment. The compressor motor configuration 104 adds energy (e.g., pressure and/or temperature) to the system fluid by compressing the system fluid from a first pressure to a second (higher) pressure, to enable the system fluid to be converted to liquid at ambient temperatures (e.g., 70-130° F.) that are relatively high by comparison to the boiling point of the system fluid, e.g., less than 22.2° F., at standard atmospheric pressure.

The compressor motor configuration 104 includes one or more compressors that increase the energy of the system fluid so that the system fluid can be evaporated in the evaporator configuration 103 to refrigerate, cool and/or condition the air of the refrigerated area 106 and the cooled items 107, according to one embodiment. Compressor motor configuration 104 includes compressor motor 128a (also referred to as a compressor, for simplicity), compressor motor 128b, and compressor motor 128n (collectively compressors 128, which represent one or more of a number of compressor motors), according to various embodiments. In one embodiment, each of the compressors has an equal capacity for vapor compression. According to one embodiment, one or more of the compressors has the capacity to provide different quantities of compression than the other compressor motors. For example, the compressor motor 128a is a 5 HP motor, the compressor motor 128b is a 7 HP motor, and the compressor motor 128n has a 15 HP motor, in one implementation. Higher horsepower motors can be configured to provide greater compressor capacity (e.g., more volumetric flow) than lower horsepower motors, and higher horsepower motors typically consume more power than lower horsepower motors. Although only three compressors/compressor motors are illustrated, the compressors 128 can represent tens or hundreds of compressor motors, according to various different embodiments. Additionally, while 5 HP, 7 HP, and 15 HP motor ratings are shown, these ratings are merely illustrative of various motor ratings available for the compressor motor configuration 104.

The compressors 128 increase the energy of the system fluid by receiving a vapor at the inlet 126 at a relatively low pressure (e.g., less than 5 psi) and by compressing and discharging the system fluid from the outlet 127 at a relatively high pressure (e.g., approximately 50-600 psi, approximately 800 psi, up to 1600 psi, or the like), as compared to the pressure of the system fluid at the inlet 126, according to one embodiment. By increasing the pressure of the system fluid, one or more of the compressors 128 increase the energy and the temperature of the system fluid. The compressors 128 enable the condenser to use ambient air to convert system fluid from a vapor phase to a liquid phase, in preparation for converting the system fluid from a liquid to a vapor in the expansion valve configuration 102 and/or in the evaporator configuration 103. The compressors 128 can be set to operate at particular RPMs and can be configured to provide a static pressure differential between the inlet 126 and the outlet 127. However, configuring the one or more compressors 128 to apply a static differential pressure between the inlet 126 and the outlet 127 is inefficient because the ambient air temperatures applied to the condenser vary between daytime and nighttime, vary based on the geographic region of the implementation of the refrigeration system 100, and may vary based on the season (e.g., summer versus winter). The conditions to which the compressor discharge affects the enthalpy of the refrigerant. As the enthalpy changes, the system component operating characteristics also change. Thus, while the system fluid may reach a particular superheated temperature using a particular combination of compressors 128 at a particular discharge pressure during one season in a particular geographic region, the same superheated temperature of the system fluid may be achieved at the outlet 120 by limiting compressor motor operations to the 5 HP compressor motor 128a in the same geographic region during a different season or during a different time of the day, according to one embodiment. Thus, by selectively operating the compressors 128 based on the characteristics of the system fluid, the energy expenditures (e.g., the power consumed) by the refrigeration system 100 may be reduced (e.g., by selectively turning off or throttling down some of the motors) based on the real-time acquisition and monitoring of characteristics of the system fluid, according to one embodiment.

The compressor motor configuration 104 also includes a compressor controller 129 and a sensor 130 to enable central refrigeration controller 105 to operate the compressor motor configuration 104 based on characteristics of the system fluid, according one embodiment. For example, the compressor controller 129 is configured to operate one or more of the compressors 128 based on a temperature, pressure, or other characteristic of the system fluid at the inlet 126, as measured/determined by the sensor 130, according to one embodiment. The compressor controller 129 is configured to operate one or more of the compressors 128 based on the temperature, pressure, or other characteristics of the system fluid at other locations within the refrigeration system 100, e.g., at the inlets 119, the outlet 120, at the inlet 108, and/or at the outlet 109, according to various embodiments. The compressor motor configuration 104 enables one or more of the compressors to be fully or partially operated, individually or concurrently, with the compressor controller 129, in order to refrigerate, cool, or otherwise air condition the refrigerated area 106 and/or the cooled items 107, according one embodiment.

The central refrigeration controller 105 is electrically and/or (e.g., communicatively) wirelessly coupled to one or more of the condenser 101, the expansion valve configuration 102, the evaporator configuration 103, the compressor motor configuration 104, and/or the refrigerated area 106, and is configured to monitor and adjust characteristics of the system fluid and/or the temperature of the refrigerated area 106, according to one embodiment. For example, the central refrigeration controller 105 is electrically coupled to one or more of the fan controller 112, the sensor 113, the expansion valves 115, the fan controller 123, the sensor 131, the sensor 124, the sensor 130, and the compressor controller 129, to monitor system fluid characteristics, to manipulate the fans 111, 122, to selectively operate/actuate the expansion valves 115, and/or to selectively operate/throttle one or more of the compressors 128, according to one embodiment. By monitoring the system fluid characteristics and selectively operating various components within the refrigeration system 100, the central refrigeration controller 105, maintains and/or adjusts the climate or temperature of the refrigerated area 106 and the cooled items 107 in an efficient manner (e.g., minimizing power consumption by reducing compressor motor operation) that takes into account geographic region, time of day, seasonal changes, and other factors that affect the temperature of refrigerated area 106, ambient air temperature, ambient air pressure, and/or other characteristics that affect the pressure-temperature characteristics of the system fluid and the heat transfer characteristics of the condenser 101 and the evaporator configuration 103, according to various embodiments.

By providing monitoring and adjusting system components within the refrigeration system, implementations of embodiments of the present disclosure allow for significant improvement to the technical fields of refrigeration, refrigeration system, food services, according to one embodiment. As one illustrative example, by monitoring system fluid (e.g., refrigerant) characteristics, adjusting expansion valves, and adjusting compressor motor operations, refrigeration areas can be cooled to deliver refrigerated items with less energy costs, using fewer natural resources, and with system components that may experience increased longevity due to decreased operational hours and wear.

Process

Figure 2:
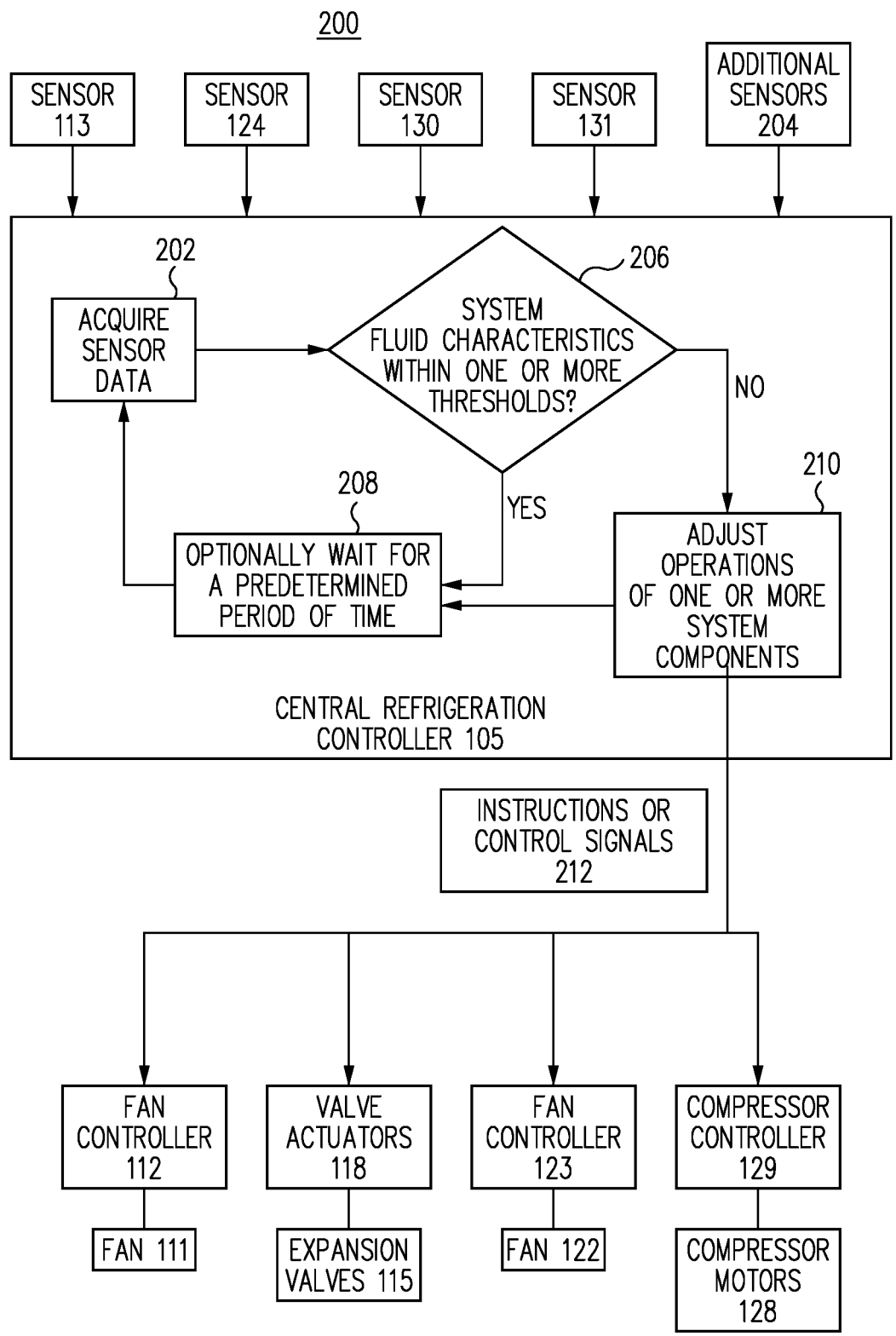
FIG. 2 is a flow diagram of a process for operating a refrigeration system, in accordance with one embodiment.

FIG. 2 illustrates a process 200 of operating the refrigeration system 100 of FIG. 1 using central refrigeration controller 105, according to one embodiment. At operation 202, central refrigeration controller 105 acquires sensor data, according to one embodiment. Central refrigeration controller 105 acquires sensor data from sensor 113, which is associated with condenser 101, from sensor 124 that is associated with the evaporator configuration 103, from sensor 130 that is associated with the compressor motor configuration 104, from sensor 131 that senses the temperature of the refrigerated area 106, and from additional sensors 204 that may also be included in the refrigeration system 100 to monitor/determine one or more temperatures, one or more pressures, and/or one or more additional characteristics of the system fluid or ambient conditions, according to one embodiment. The process proceeds to operation 206, according to one embodiment.

At operation 206, the central refrigeration controller 105 determines if the system fluid characteristics are within the one or more thresholds, according to one embodiment. For example, central refrigeration controller 105 compares sensor data from the sensor 113, the sensor 124, the sensor 130, the sensor 131, and/or the additional sensors 204 to one or more thresholds stored by the central refrigeration controller 105, to determine whether the data from one or more of the particular sensors is within the one or more predetermined or stored thresholds, according to one embodiment. For example, the sensor 124 is configured to measure the temperature and/or pressure of the vapor that is discharged from the evaporator configuration 103 at the outlet 120. The central refrigeration controller 105 is configured to determine if the data from the sensor 124 indicates that the system fluid discharge from the outlet 120 is less than 6 degrees superheated, as one example, or is greater than 8 degrees superheated, as another example, or any other desired temperature and/or pressure condition of the particular system fluid, according to one embodiment. The central refrigeration controller 105 can then determine if the system fluid discharged from the outlet 120 has a temperature that is indicative of 6-8 degrees above the boiling temperature for the system fluid, e.g., R-134A, according to one embodiment. If the system fluid characteristics, e.g., temperature, is within one or more thresholds, the process proceeds to operation 208, according to one embodiment. If the system fluid characteristics exceed or fall below the one or more thresholds, the process proceeds to operation 210, according one embodiment.

At operation 208, the central refrigeration controller 105 optionally waits for a predetermined period of time, prior to proceeding back to operation 202 to acquire sensor data, according one embodiment. The predetermined period of time can be a millisecond, a second, 10 seconds, 30 seconds, a minute, or between a minute and 30 minutes, or the like, to enable the refrigeration system 100 to stabilize after a change, or to wait a duration of time to reasonably allow the system to react to any operational adjustments made to the expansion valves, compressors, and condenser, prior to re-acquiring additional sensor data, according to one embodiment. In an alternative implementation of the central refrigeration controller 105, the central refrigeration controller 105 continuously acquires sensor data from each sensor and repeatedly reiterates the acquisition of sensor data from each of the sensors. From operation 208, the process returns to operation 202, according to one embodiment.

At operation 210, the central refrigeration controller 105 adjusts operations of one or more system components, according to one embodiment. The central refrigeration controller 105 is configured to adjust operations of one or more system components if the system fluid characteristics is not within one or more thresholds, and/or if ambient or refrigerated area conditions change so that one or more compressors can be shut down or throttled down, to correct the system fluid characteristics and cause the refrigeration system 100 to operate within a predetermined, programmed, or desired state, according to one embodiment. The central refrigeration controller 105 is configured to transmit instructions or control signals 212 to one or more system components such as, but not limited to, the fan controller 112, the valve actuators 118, the fan controller 123, and the compressor controller 129, to respectively adjust/manipulate the operation of the fan 111, the expansion valves 115, the fan 122, and/or the compressors 128, respectively, according to one embodiment.

Central refrigeration controller 105 adjusts operations of one or more system components in accordance with a predetermined adjustment policy, according to one embodiment. The policy determines the priority with which the central refrigeration controller 105 modifies the system components. The adjustment policy arbitrarily applies a system component modification priority/order, in one embodiment. The adjustment policy determines the system component modification priority/order based on the easiest system components to manipulate/adjust, according to one embodiment. The adjustment policy establishes a system component modification priority/order based on the system components that will provide the fastest response/change to the refrigeration system 100, according to one embodiment. The adjustment policy establishes a system component modification priority/order according to which system characteristics (e.g., superheat temperature of vapor), is most important, according to one embodiment. For example, to ensure to protect the compressor from damage by liquid within the superheated vapor, e.g., within the system fluid, the adjustment policy may prioritize the characteristics of the system fluid that is discharged from outlet 120 over other characteristics of the system fluid, in order to protect the compressors 128 from damage, according to one embodiment. In one embodiment, the adjustment policy establishes a system component modification priority/order based on the instructions/changes to system components that they have the greatest impact on the system power consumption, according to one embodiment. For example, central refrigeration controller 105 may prioritize adjustments made to the compressor controller 129 because turning on additional compressors may provide a more immediate effect on the operations of the overall refrigeration system 100 than simply increasing the speed of the fan 122 within the evaporator configuration 103, according to one embodiment. The examples provided for the adjustment policy of the central refrigeration controller 105 are illustrative examples and other examples may occur to persons of ordinary skill having the benefit of this disclosure, according to one embodiment. The operation 210 proceeds to operation 208 to optionally wait for a predetermined period of time to enable one or instructions or control signals 212 to take effect within the refrigeration system 100, prior to acquiring sensor data at operation 202, according to one embodiment.

Figure 3:
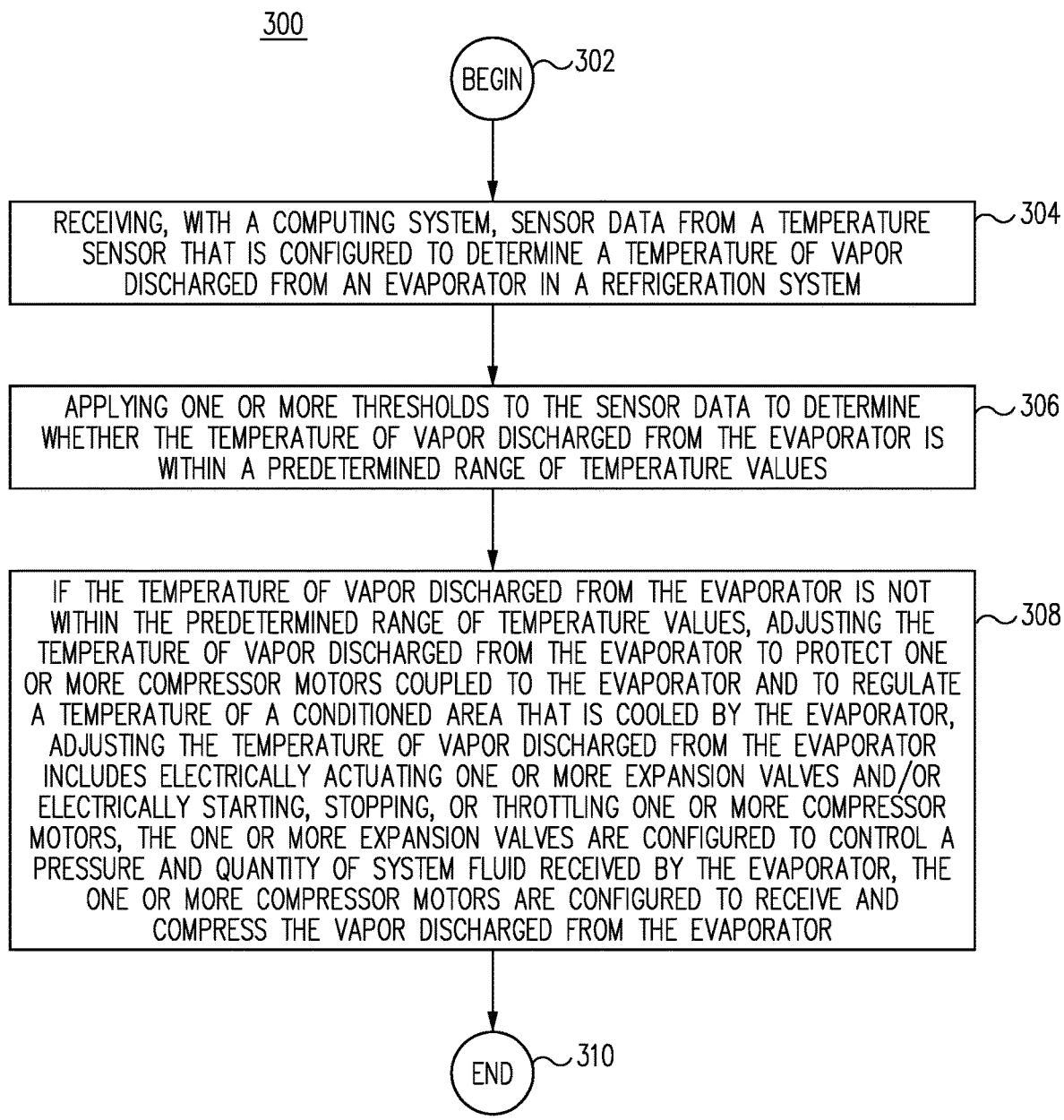
FIG. 3 is a flow diagram of a process for operating a refrigeration system, in accordance with one embodiment.

FIG. 3 illustrates a process 300 operating a refrigeration system, according to one embodiment.

At operation 302, the process begins. Operation 302 proceeds to operation 304, according to one embodiment.

At operation 304, the process includes receiving, with a computing system, sensor data from a temperature sensor that is configured to determine a temperature of vapor discharged from an evaporator in a refrigeration system, according to one embodiment. Operation 304 proceeds to operation 306, according to one embodiment.

At operation 306, the process includes applying one or more thresholds to the sensor data to determine whether the temperature of vapor discharged from the evaporator is within a predetermined range of temperature values, according to one embodiment. Operation 306 proceeds to operation 308, according to one embodiment.

At operation 308, the process includes, if the temperature of vapor discharged from the evaporator is not within the predetermined range of temperature values, adjusting the temperature of vapor discharged from the evaporator to protect one or more compressors coupled to the evaporator and to regulate a temperature of an air conditioned area that is cooled by the evaporator, adjusting the temperature of vapor discharged from the evaporator includes electrically actuating one or more expansion valves and/or electrically starting, stopping, or throttling one or more compressor motors, the one or more expansion valves are configured to control a pressure and quantity of system fluid received by the evaporator, the one or more compressors are configured to receive and compress the vapor discharged from the evaporator, according to one embodiment. Operation 308 proceeds to operation 310, according to one embodiment.

At operation 310, the process ends.

Figure 4:
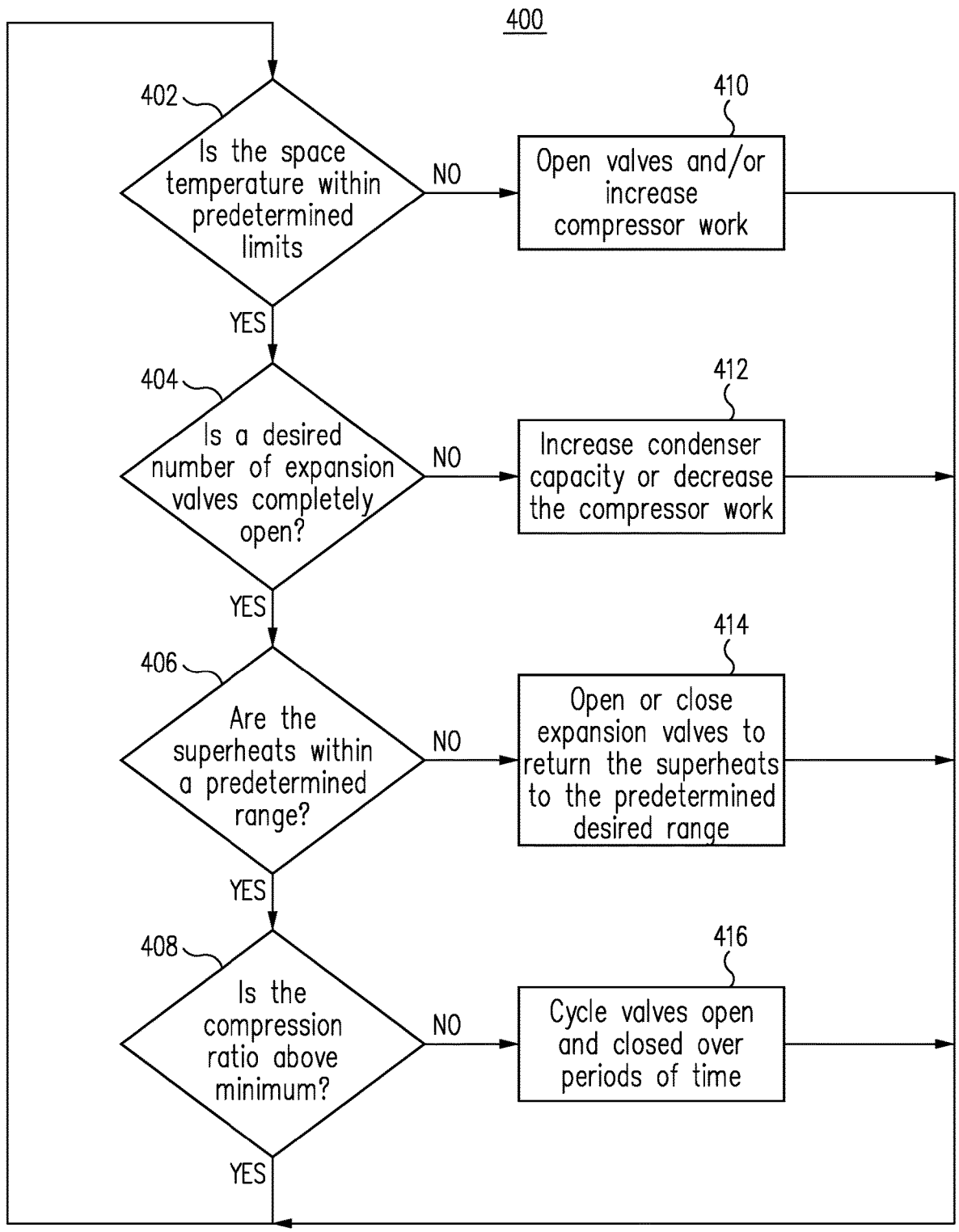
FIG. 4 illustrates a flow diagram of a process for operating a central refrigeration controller of a refrigeration system, according to one embodiment.

FIG. 4 illustrates a process 400 operating central refrigeration controller of a refrigeration system, according to one embodiment.

Process operations discussed herein are, in one embodiment, executed by central refrigeration controller 105. In one embodiment, central refrigeration controller 105 controls one or more system components directly, such as condenser 101. In one embodiment, central refrigeration controller 105 controls one or more system components indirectly, such as compressor motor configuration 104. In one embodiment, to cause compressor motor configuration 104 to perform an action, such as to turn on or turn off or perform a different intermediate action, move to an intermediate setting, etc., central refrigeration controller 105 issues a command for the action to happen which is received and acted on by a subcomponent controller, such as compressor controller 129.

Many of the process operations discussed in this disclosure are allowed to be performed in any desired order, and continuously, or with delays at one end of the process or another, or between one or more process operations, as desired by an implementer of the processes discussed herein.

Further, due to changing environmental conditions in the refrigerated area and in the external environment where one or more of the system components are placed, effects of one or more process operations being performed may not be seen at one or more of the sensors of the system for several minutes. For example, if the system adjusts an expansion valve to a new position, a condition of the system fluid at the inlet to the compressor may not be able to be determined as a stable state for several minutes, or for however long the system takes to stabilize in the new configuration.

Process 400 may begin at many different operations, since process 400 is essentially seeking an optimized condition due to changing circumstances, and the optimized condition is affected by constantly changing environmental conditions in the external environment, e.g. the temperature of ambient air at the compressor and at the condenser, and at the refrigerated area, e.g. due to restocking of the refrigerated area, customers looking for, handling and removing items from the refrigerated area, and for other reasons. Such an optimized condition may take time to achieve, and may never be achieved, due to continuous changes occurring to the environments of the system components, including the refrigerated area. However, by employing the teachings discussed herein, significant minimization of power consumption will be achieved.

For simplicity, the discussion herein will begin at operation 402 during which sensor 131 is used to examine the temperature of refrigerated area 106 and determine whether refrigerated area 106 is within predetermined temperature limits. Predetermined high and low limits of temperature are determined, in one embodiment, in advance and consideration of what those limits should be include whether the items being cooled are required to be frozen, whether the items have an optimum temperature or temperature range to minimize spoilage, and other factors. Alternatively, high and low limits are implied rather than being overt (for any temperature/pressure or other condition discussed in this disclosure), through determination of a desired setpoint, with a limit of how much variation from the setpoint is allowed prior to taking action to provide more or less cooling to refrigerated area 106.

If, at operation 402 a determination is made that refrigerated area 106 is within the implied or overt high and low temperature limits, process flow proceeds with operation 404 during which the expansion valve positions are determined, through electrical examination of valve position, through reviewing the stored digital representations of the valve positions discussed above, or through other automatic means. Any adjustment to one or more expansion valves according to process operations discussed herein may be made by commanding a given expansion valve to move to a particular position, or through knowing the current position of the expansion valve and commanding the expansion valve to move a particular number of degrees towards more closed or more open positions, or through any other manner now known or later developed.

Further, in one embodiment, following determination of the positions of expansion valve positions, a determination is made of whether at least a predetermined number of expansion valves are fully open or are alternatively open to a predefined maximum position, e.g. 95% open. As discussed above, having an expansion valve fully open minimizes a pressure differential across the fully open expansion valve while also increasing system fluid flow through the fully open expansion valve.

If, at operation 404, a determination is made that at least a desired minimum number of expansion valves are fully open, process flow proceeds with operation 406 during which a determination is made of whether the system fluid temperature is within a predetermined temperature range. In one embodiment, determination is made of whether the system fluid temperature is within a predetermined temperature range at the output of the evaporator circuits, e.g. at sensor 124, such as a range of 6-8° F. above the boiling temperature for the system fluid, e.g., 6-8° F. above 22.2° F. at 20 psig sea level for R-134A refrigerant, according to one embodiment. In one embodiment, determination is made of whether the system fluid temperature is within a predetermined temperature range at sensor 130 of inlet 126 of compressor motor configuration 104s, such as a range of 18-22° F. above the boiling temperature for the system fluid, e.g., 18-22° F. above −41.4° F. for R-134A refrigerant, according to one embodiment.

In one embodiment, if the system fluid temperature(s) are within predetermined temperature ranges, a determination is made, at operation 408, as to whether a compression ratio seen across compressor motor configuration 104 is above a predetermined minimum compression ratio. In one embodiment, a compression ratio is determined by measuring a system fluid pressure at outlet 127 and dividing a data value representing that system fluid pressure at outlet 127 by a data value representing system fluid pressure determined or otherwise measured at inlet 126. Sensors are outlet 127 and inlet 126 are configured to measure one or more of temperature and pressure, and provide one or those data values, according to one embodiment.

In one embodiment, the predetermined compression ratio is set by a manufacturer. In one embodiment, the predetermined compression ratio is a pressure ratio that must be met in order for the compressor(s), such as compressor motor configuration 104, to operate without incurring other than normal wear and tear damage. In one embodiment, a minimum compression ratio is between 1.2 and 1.7. In one embodiment, a minimum compression ratio is 1.5.

In one embodiment, if a compression ratio seen across compressor motor configuration 104 is at a predetermined minimum compression ratio, process flow returns to operation 402. In one embodiment, if a compression ratio seen across compressor motor configuration 104 is at a predetermined minimum compression ratio, the expansion valves are cycled between one or more open positions and a closed position, in order to regulate the amount of cooling in refrigerated area 106 and maintain pressures and temperatures in a range where minimum compressor power is consumed.

If the compression ratio is below the predetermined minimum compression ratio, compressors will at best be inefficient, and may at worst be harmed by operating compressor motor configuration in that condition, depending on how far below the predetermined minimum compression ratio the actual compression ratio is during operation of compressor motor configuration 104. The compression ratio may be raised by either lowering a pressure detected by sensor 130 at inlet 126, by closing one or more expansion valves, for example, or by raising a pressure at outlet 127 such as by decreasing the condenser throughput by turning off fan 111. If the compression ratio is at the predetermined minimum compression ratio, no action is necessarily required, unless other conditions need to be incrementally changed, such as those discussed herein.

If, at operation 402, refrigerated area 106 is not within predetermined temperature limits and thus is hotter or colder than desired, process flow proceeds at operation 410 during which the flow of system fluid is increased through evaporator circuits 121 by opening one or more expansion valves more than it is currently open. Expansion valves discussed herein are electronically adjustable to various degrees of opening, from not open at all to fully open, with varying increments of open or closed, depending on the particular expansion valves being employed in a given design. When an expansion valve is opened, at operation 410, one or more expansion valves 121 are advanced towards being open more fully than a prior increment of opening. Correspondingly, when a valve is closed, at operation 410, one or more expansion valves 121 are advanced towards being closed more fully than a prior increment of closing.

As those of ordinary skill having the benefit of this disclosure will appreciate, opening or closing one or more expansion valves to increase or decrease the system fluid flow will have a downstream effect on temperatures and pressures elsewhere in the system. As one example, opening an expansion valve typically causes the output of the evaporator circuits to be a lower temperature. Therefore, in order to compensate, the compressor motor configuration might need to be commanded to work harder, e.g. to turn on more often, to increase the number of compressors working, etc. Further, it may also be necessary to turn on the condenser fan more frequently, in order to keep the pressures in the system within proper ranges.

If, at operation 404, during which the expansion valve positions are determined, through electrical examination of valve position, through reviewing the stored digital representations of the valve positions discussed above, or through other automatic means, other determinations may be made, such as whether the current compression ratio is at or near a predetermined minimum compression ratio set by or otherwise determined by a manufacturer, as one example. If, at operation 404, a desired number of expansion valves are not completely open, one or more actions are taken at operation 412, if available.

As one example of actions that may be taken to move towards a condition where at least a predetermined minimum number of expansion valves are completely open, which, in one embodiment, also will result in a decreased compression ratio, condenser capacity is, or may be, increased through turning on or otherwise increasing the speed of fan 111. Another example of actions that may be taken to move towards a condition where at least a predetermined minimum number of expansion valves are completely open is to decrease the work compressor motor configuration 104 is doing by cycling one or more of the compressors, turning them off for longer periods, or, in the case of multiple compressor motors, turning on only a subset of the available compressors, and/or turning on and turning off one or more compressors at less frequent intervals.

If, at operation 406, a determination was made that the system fluid temperature is not within the predetermined temperature range, process flow proceeds with operation 414 during which one or more operations are performed in order to return the temperatures to a desired temperature range. Recall that the system fluid temperature at the output of the evaporator circuits, e.g. at sensor 124, are, in one embodiment, associated with a desired range of 4-10° F. above the boiling temperature for the system fluid, e.g., 4-10° F. above 22.2° F. for R-134A refrigerant, according to one embodiment. In one embodiment, a desired predetermined temperature range at sensor 130 of inlet 126 of compressor motor configuration 104s, such as a range of 18-22° F. above the boiling temperature for the system fluid, e.g., 18-22° F. above 22.2° F. for R-134A refrigerant. Persons of ordinary skill will recognize the temperatures of interest as "superheats." At the inlet sensor 130 to the compressor it is important to have the system fluid be in a vapor state, which is why the temperature and/or pressure of the system fluid at the inlet to the compressor motor circuits is determined. By knowing the temperature and/or pressure of the system fluid at various points in the system, a determination may be made, if desired, as to whether the system fluid is in a liquid state, a saturated state, or a gaseous state at the different locations.

In one embodiment, if the system fluid temperatures are too low, based on the pressure, either at sensor 124 or at sensor 130 of inlet 126, one action that is performed in order to raise the superheat temperature is to incrementally close one or more expansion valves, reducing the flow of system fluid through the expansion valves and through the evaporator circuits.

In one embodiment, if the system fluid temperatures are too high either at sensor 124 or at sensor 130 of inlet 126, at least one of the actions that are performed in order to lower the superheat temperature at those sensors is to incrementally open one or more expansion valves, increasing the flow of system fluid through the expansion valves and through the evaporator circuits.

In one embodiment, a determination is made, at operation 408, that a compression ratio seen across compressor motor configuration 104 is not above a predetermined minimum compression ratio.

Recall that, in one embodiment, a compression ratio is determined by measuring a system fluid pressure at outlet 127 and dividing that system fluid pressure at outlet 127 by a system fluid pressure determined or otherwise measured at inlet 126. Sensors at outlet 127 and inlet 126 are configured to measure one or more of temperature and pressure, according to one embodiment.

In one embodiment, the predetermined minimum compression ratio is set by a manufacturer. In one embodiment, the predetermined minimum compression ratio is a pressure ratio that must be met in order for the compressor(s), such as compressor motor configuration 104, to operate without incurring other than normal wear and tear damage. In one embodiment, a minimum compression ratio is between 1.2 and 1.7. In one embodiment, a minimum compression ratio is 1.5.

In one embodiment, if a compression ratio seen across compressor motor configuration 104 is at a predetermined minimum compression ratio, process flow returns to operation 402. In one embodiment, if a compression ratio seen across compressor motor configuration 104 is at a predetermined minimum compression ratio, the expansion valves are cycled between one or more open positions, e.g. between one or more positions such as 20% open, 30% open, 50% open 70% open, or any other amount or degree of opening, and a closed position, in order to regulate the amount of cooling in refrigerated area 106 and maintain pressures and temperatures in a range where minimum compressor power is consumed, based on the variation in environmental conditions.

If the currently determined compression ratio is below the predetermined minimum compression ratio, compressors will at best be inefficient, and may at worst be harmed by operating compressor motor configuration in that condition. The compression ratio may be raised to at least the predetermined minimum compression ratio or to a pressure above the minimum predetermined compression ratio, by either lowering a pressure detected by sensor 130 at inlet 126, by closing one or more expansion valves, for example, or by raising a pressure at outlet 127 such as by decreasing the condenser throughput by turning off fan 111. At a time when the compression ratio is at or above the predetermined minimum compression ratio, no action is necessarily required, unless other system conditions need to be incrementally changed, such as those discussed herein.

As noted above, the specific illustrative examples discussed above are but illustrative examples of implementations of embodiments of the method or process for operating a refrigeration system. Those of skill in the art will readily recognize that other implementations and embodiments are possible. Therefore, the discussion above should not be construed as a limitation on the claims provided below.

In accordance with an embodiment, a refrigeration system includes a condenser configured to receive a first vapor and discharge a liquid. The system includes one or more expansion valves coupled to the condenser with one or more first sections of pipe, the one or more expansion valves configured to convert the liquid to a liquid-vapor mix at a pressure of the liquid-vapor mix that is lower than a pressure of the liquid, at least partially based on fluid expansion characteristics of the one or more expansion valves, according to one embodiment. The system includes an evaporator coupled to the one or more expansion valves with one or more second sections of pipe, the evaporator configured to convert the liquid-vapor mix to a second vapor, a pressure of the second vapor being lower than a pressure of the first vapor, according to one embodiment. The system includes one or more compressors coupled to the evaporator with one or more third sections of pipe, the one or more compressors configured to receive the second vapor, compress the second vapor, and discharge the first vapor at the pressure of the first vapor that is greater than the pressure of the second vapor, according to one embodiment. The system includes a system controller electrically coupled to the one or more expansion valves and electrically coupled to the one or more compressors, the system controller configured to selectively actuate the one or more expansion valves at least partially based on a temperature of the second vapor discharged from the evaporator, to control a temperature of a refrigerated area, according to one embodiment.

In accordance with an embodiment, a method for operating a refrigeration system includes receiving, with a computing system, sensor data from a temperature sensor that is configured to determine a temperature of vapor discharged from an evaporator in a refrigeration system. The method includes applying one or more thresholds to the sensor data to determine whether the temperature of vapor discharged from the evaporator is within a predetermined range of temperature values, according to one embodiment. The method includes, if the temperature of vapor discharged from the evaporator is outside of the predetermined range of temperature values, adjusting the temperature of vapor discharged from the evaporator to protect one or more compressors coupled to the evaporator and to regulate a temperature of a refrigerated area that is cooled by the evaporator, according to one embodiment. Adjusting the temperature of vapor discharged from the evaporator includes electrically actuating one or more expansion valves and/or electrically starting, stopping, or throttling the one or more compressor motors, according to one embodiment. The one or more expansion valves are configured to control a pressure of system fluid and quantity of the system fluid received by the evaporator, according to one embodiment. The one or more compressors are configured to receive and compress the vapor discharged from the evaporator, according to one embodiment.

In accordance with an embodiment, a method for operating a refrigeration system includes receiving, with a computing system, sensor data from a pressure sensor that is configured to determine a suction pressure of vapor of a system fluid at an inlet of a compressor configuration in a refrigeration system, the compressor configuration including a plurality of compressor motors, according to one embodiment. The method includes applying one or more thresholds to the sensor data to determine whether the suction pressure of vapor at the inlet of the compressor configuration from an evaporator in the refrigeration system is within a predetermined range of pressure values, according to one embodiment. The method includes if the suction pressure of vapor discharged from the evaporator is below the predetermined range of pressure values, reducing energy consumption by the refrigeration system by actuating one or more expansion valves and/or by reducing revolutions per minute of one or more of the plurality of compressors of the compressor configuration, according to one embodiment.

By providing monitoring and adjusting system components within the refrigeration system, implementations of embodiments of the present disclosure allows for significant improvement to the technical fields of refrigeration, refrigeration system, food services, according to one embodiment. As one illustrative example, by monitoring system fluid (e.g., refrigerant) characteristics, adjusting expansion valves, and adjusting compressor motor operations, refrigeration areas can be cooled to deliver refrigerated items with less energy costs, using fewer natural resources, and with system components that may experience increased longevity due to decreased operational hours and wear.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "extracting,"

"filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A refrigeration system, comprising:
one or more condensers configured to receive a first vapor and discharge a liquid;
one or more expansion valves coupled to one or more of the condensers, wherein the one or more expansion valves include an electrically operated actuator, the one or more expansion valves configured to:
provide digital representations of valve positions to enable a system controller to acquire and manipulate the valve positions; and
convert the liquid to a liquid-vapor mix at a pressure of the liquid-vapor mix that is lower than a pressure of the liquid, at least partially based on fluid expansion characteristics of the one or more expansion valves;
one or more evaporators coupled to the one or more expansion valves, wherein the evaporators include a plurality of evaporator circuits, and are configured to convert the liquid-vapor mix to a second vapor, a pressure of the second vapor being lower than a pressure of the first vapor;
one or more compressors coupled to one or more of the evaporators, the one or more compressors configured to receive the second vapor, compress the second vapor, and discharge the first vapor to an input of one or more of the condensers at a pressure of the first vapor that is greater than the pressure of the second vapor; and
a system controller electrically directly or indirectly coupled to the one or more expansion valves, the one or more condensers and the one or more compressors, the system controller configured to perform one or more of:
selectively actuating the one or more expansion valves at least partially based on a temperature differential of the first vapor and the liquid in the condenser;
selectively actuating the one or more expansion valves to manipulate a pressure differential between the liquid and the liquid-vapor across the one or more expansion valves;
selectively directing the liquid-vapor into one or more of the plurality of evaporator circuits to manipulate the temperature of the second vapor discharged from the evaporator;
operating some of the one or more compressors at least partially based on a temperature differential of the first vapor and the liquid in the condenser;
selectively adjusting operating characteristics of the one or more compressors, the one or more condensers, and/or the one or more expansion valves, at least partially based on a temperature of the second vapor discharged from the evaporator, to control a temperature of a refrigerated area.

2. The system of claim 1, wherein the system controller is configured to operate some of the one or more compressors at least partially based on the temperature of the second vapor discharged from the evaporator, to reduce a quantity of power drawn by the one or more compressors and by the refrigeration system.

3. The system of claim 1, wherein the system controller is configured to operate the one or more compressors by selectively performing one or more of stopping, starting, throttling down, and throttling up one or more of the compressors.

4. The system of claim 1, wherein the system controller is configured to operate the one or more compressors at least partially based on a pressure of the second vapor received by the one or more compressors through one or more sections of pipe.

5. The system of claim 1, wherein the system controller is configured to selectively actuate the one or more expansion valves at least partially based on a temperature and/or pressure of the second vapor received by the one or more compressors through one or more sections of pipe.

* * * * *